James R. Parker
Maurice G. Brazzil
INVENTORS
BY J. Vincent Martzi
Joe E. Edwards
M. Harvey Gray
ATTORNEYS James R. Parker
Maurice G. Brazzil
INVENTORS
BY J. Vincent Martin
Joe E. Edwards
M. Harvey Gray
ATTORNEYS APPARATUS FOR PERFORMING MULTIPLE METAL WORKING OPERATIONS ON PIPE
Original Filed Oct. 8, 1954 4 Sheets-Sheet 3
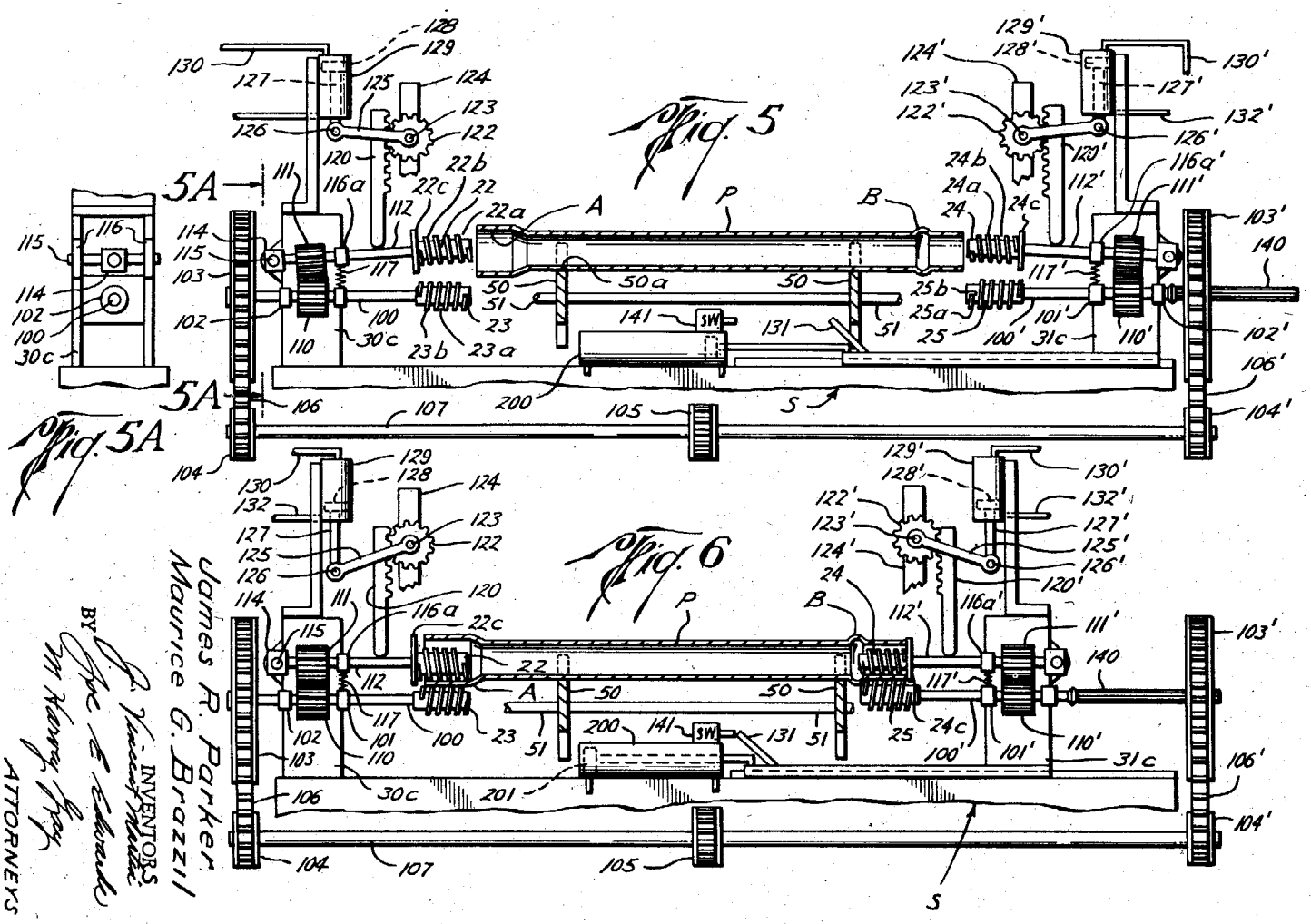
James R. Parker
Maurice G. Brazzil
INVENTORS
BY J. Vincent Martin
Joe E. Edwards
M. Harvey Gray
ATTORNEYS James R. Parker
Maurice G. Brazzil
INVENTORS
BY J. Vincent Martin
Joe E. Edwards
M. Harvey Gray
ATTORNEYS United States Patent Office Re. 24,441
Reissued Mar. 4, 1958

24,441

APPARATUS FOR PERFORMING MULTIPLE METAL WORKING OPERATIONS ON PIPE

James R. Parker, Bossier City, La., and Maurice G. Brazzil, Houston, Tex.; said Brazzil assignor to said Parker Original No. 2,800,942, dated July 30, 1957, Serial No. 461,268, October 8, 1954. Application for reissue October 8, 1957, Serial No. 690,168

9 Claims. (Cl. 153—2)

Matter enclosed in heavy brackets [ ] appears in the original patent but forms no part of this reissue specification; matter printed in italics indicates the additions made by reissue.

This invention relates to new and useful improvements in apparatus for threading pipe.

An object of this invention is to provide new and improved apparatus for threading pipe, wherein both ends of a section of pipe are threaded simultaneously to thereby obtain more uniform threads on the pipe than would be formed when each end of the section of pipe is separately threaded and also to effect more rapid operation.

An important object of this invention is to provide a new and improved apparatus for rolling threads on a pipe, and particularly on pipe known as "shot hole" pipe, wherein the pipe is first formed with an upset portion at one end of the pipe so that the male end of one pipe is adapted to fit within the female end of another pipe, whereby a plurality of such threaded pipes are adapted to be interconnected to form an extended length of pipe.

Another object of this invention is to provide an improved apparatus wherein a section of pipe moves into a first station wherein one end thereof is upset, then moves to a second station wherein a stop bead or shoulder is formed on its opposite end, and finally moves into a third station wherein threads are simultaneously formed on each end thereof; the method being carried out in a continuous fashion to minimize time and labor and effect economic savings.

Another object of this invention is to provide an improved apparatus having thread-forming elements which are adapted to form the threads by a rolling operation, together with means for simultaneously engaging each end of the pipe section being worked upon with a pair of said thread-forming elements, whereby subsequent rotation of said elements rolls the desired threads into both ends of the pipe section in a single operation.

Another object of this invention is to provide an improved apparatus for rolling threads on the end of a section of pipe, wherein such rolling of the threads is performed by a pair of rolling dies which have a gear-drive connection which is adapted to remain engaged even though such dies are pivoted for separation to receive the end of the section of pipe.

Another object of this invention is to provide in combination with an apparatus for rolling threads on a section of pipe, a device for forming an upset portion at one end of the section of pipe and another device for forming a bead near the other end of the section of pipe at a predetermined distance therefrom, whereby said bead serves as a stop for the upset portion on the end of the adjacent section of pipe when such sections are connected together to relieve threads of excessive loads.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 5 is a sectional view illustrating the thread-forming portion of the apparatus of Figure 2, with the parts in position prior to the insertion of the section of pipe for the thread-rolling operation.

Figure 5A is an end view taken on line 5A—5A of Figure 5.

Figure 6 is a view similar to Figure 5, but illustrating an apparatus with the parts in position during the rolling of the threads on the section of pipe.

Figure 1:
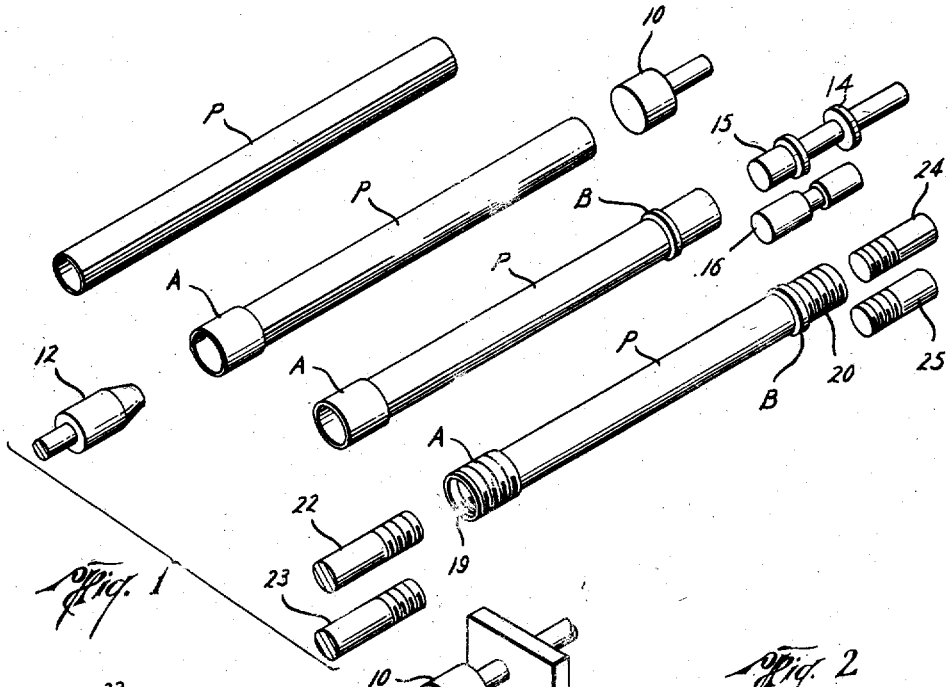
Figure 1 is a schematic isometric view illustrating the basic method steps of this invention.

In carrying out the method of this invention, a section of pipe P (Figure 1) having plain ends is first formed with an upset or enlarged portion A. Such upset portion A can, of course, be formed with various types of apparatus, but as schematically shown in Figure 1, one type of apparatus would include a stop member 10 disposed at one end of the pipe P and the upset-forming or expanding member 12 disposed at the other end of the pipe P, whereby upon movement of the stop member 10 and the said forming member 12 toward each other with the pipe P therebetween, the upset portion A is formed by expanding one of the plain ends of the pipe P. Thereafter, a bead B is formed on the pipe P at a predetermined distance from the opposite end of the pipe P from that end at which the upset portion A is formed. In forming the bead, a pair of bead-forming rolls 15 and 16 are provided, with the roller 15 being positioned inside of the pipe P and the roller 16 being outside thereof, whereby upon relative rotation of such rollers 15 and 16 the annular bead B is formed. A stop member 14 on the shaft of roller 15 properly locates the bead. The annular bead B is formed a sufficient distance from the end of the pipe P so that upon connecting a plurality of sections of the pipe P together, such annular bead B serves as a stop to limit the extent of threading of the pipe sections together whereby the strain on the threads is relieved, particularly where such pipe is vertically suspended in use as in the case of pipe known as "shot-hole" pipe.

In the next step of the method, the pipe P is threaded at the upset portion A with internal threads 19 and the other end of the pipe P adjacent the bead B is formed with external threads 20. The threads 19 and 20 are formed simultaneously during the rotation of the pipe P in one direction and preferably, such threads 19 and 20 are formed by rolling dies 22 and 23 located at one end of the pipe P and rolling dies 24 and 25 located at the other end of pipe P. The forming of threads in pipe with rolling dies is known, and an example thereof is illustrated in the U. S. patent to Parker et al., No. 2,548,444, but so far as is known, threads have been rolled heretofore on each end of a pipe separately. However, in this invention, the threads are formed on each end simultaneously during the rolling operation and a more uniform thread actually results than when the pipe ends are separately threaded. Also the operation is materially speeded up which results in economic saving.

Figure 2:
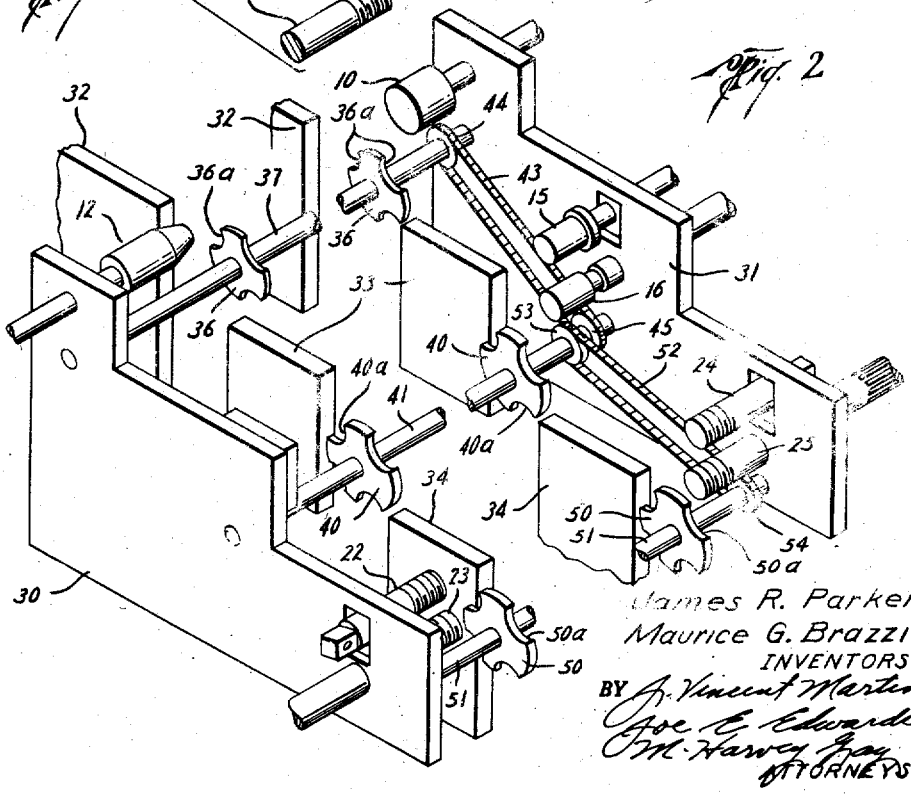
Figure 2 is an isometric view illustrating schematically the combination apparatus of this invention for forming a section of pipe with threads thereon at each end thereof.
Figures 3, 4, 4A:
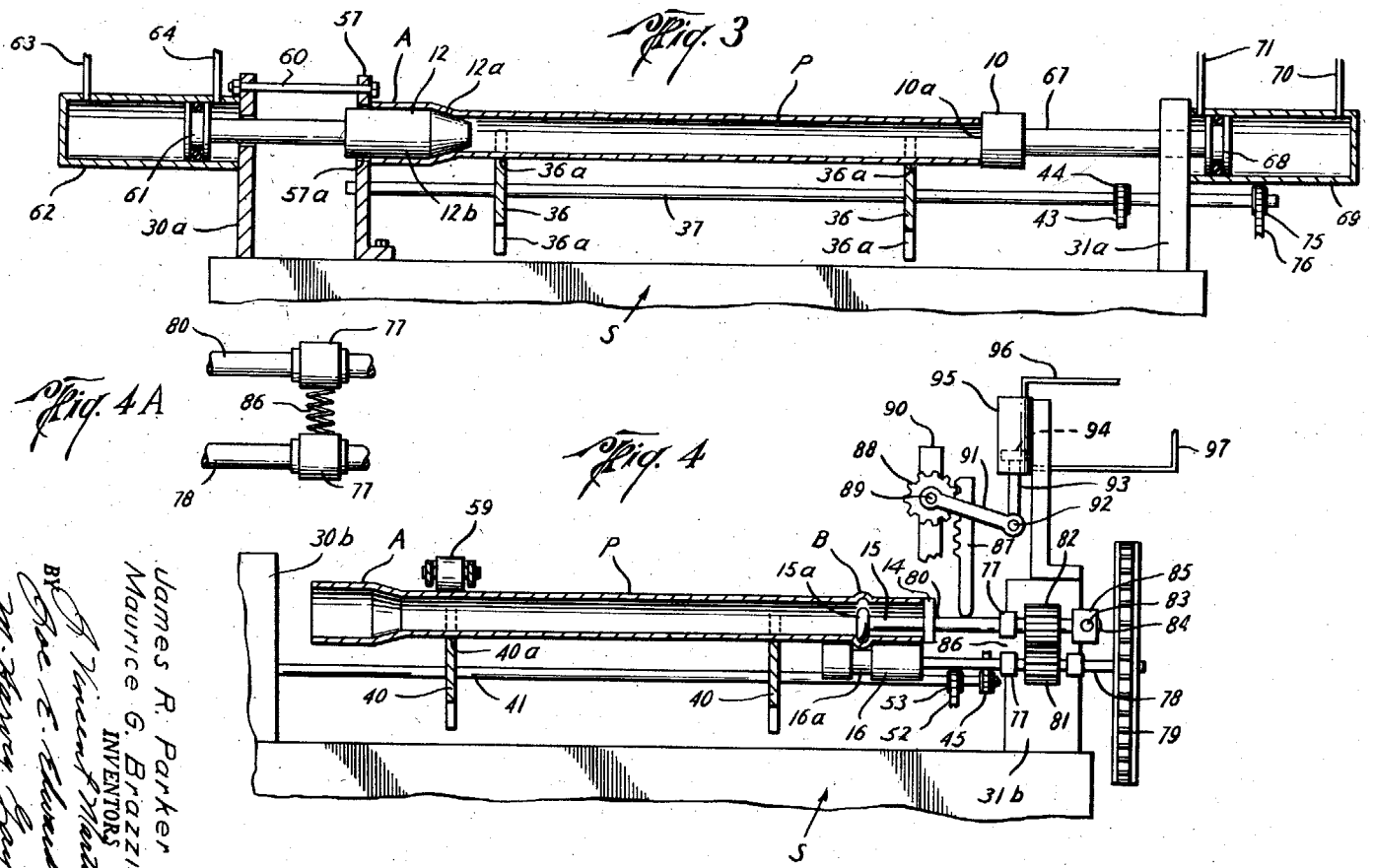
Figure 3 is a sectional view illustrating the portion of the apparatus shown in Figure 2 for forming the upset at one end of a section of pipe.
Figure 4 is a sectional view illustrating the bead-forming portion of the apparatus illustrated in Figure 2.
Figure 4A is a detailed elevation showing the mounting of the resilient means used in the structure of Figure 4.

The above-described method can, of course, be carried out with various types of apparatus, and one type of suitable apparatus is illustrated in Figures 2–6. In Figure 2, the combination apparatus is shown with end frames or frame members 30 and 31 which are laterally spaced from each other, and each of which may be formed of one or more sections. Disposed between such frame members 30 and 31 are support members 32, 33 and 34. The support members 32 are disposed near the upper ends of the frame members 30 and 31 and can serve as a rack for the pipe P before it has been passed through the apparatus of this invention. The pipe P with its plain ends can be fed from the support members 32 by gravity, by hand or by a suitable mechanism (not shown) to the upset-forming portion of the apparatus which includes the upset-forming mandrel 12 and the stop member 10. With the section of pipe P positioned between such members 10 and 12, they are moved relatively to each other so as to form the upset portion A on the pipe P, as will be explained in detail in connection with this portion of the apparatus which is illustrated in Figure 3. When the members 10 and 12 are laterally retracted, the section of pipe P is then passed to the next section of support members 33 by a rotation of star feeders 36 which are mounted on a laterally-extending shaft 37 positioned between the frame members 30 and 31. The rotation of the shaft 37 and therefore the rotation of the star feeder 36, is controlled by an intermittently-operated motor (not shown) connected to the shaft 37, or by any other suitable means. Each or the star feeders 36 has a plurality of notches 36a into one of which the external portion of the pipe P is positioned during the feeding of the pipe P from its location between the forming members 10 and 12 to the support members 33.

The section of pipe P rolls by gravity or is fed by hand, or any other suitable mechanism (not shown) along the support members 33 for positioning in alignment with the bead-forming dies 15 and 16. The details of the construction of the bead-forming dies 15 and 16 is described hereinafter in connection with the illustration of Figure 4, but, generally speaking, the pipe P is formed with the bead by manually positioning the pipe P so that the die 15 extends into the bore of one end of the pipe P. Thereafter the dies 15 and 16 are rotated relative to each other to form the annular bead B in the section of pipe P. After the pipe P is released from the bead-forming rollers 15 and 16, it is manually retracted from the dies 15 and 16 and then is fed to the next support members 34 by star feeders 40 which are substantially duplicates of the star feeders 36 and have similar notches 40a for receiving the sections of pipe P. The star feeders 40 are on a shaft 41 which extends through the frame members 30 and 31, and the shaft 41 is rotated by any suitable mechanism, but preferably as shown in Figure 2, a chain 43 extends from a sprocket 44 on the shaft 37 to a sprocket 45 on the shaft 41 so that the rotation of the shaft 37 is imparted to the shaft 41.

The pipe P moves by gravity, by hand or by any suitable mechanism (not shown) along the support members 34 to the thread-forming portion of the apparatus which includes the thread-forming rollers 22, 23 and 24, 25. The details of the thread-forming rollers and the mechanism connected therewith are described hereinafter in connection with Figures 5 and 6. The pipe P is positioned on the rollers 22, 23 and 24, 25 by moving the two sets of rollers toward each other to locate the roller 22 in one end of the pipe P and the roller 24 within the other end of the pipe P. Thereafter the rollers 22, 23 and 24, 25 are rotated so as to roll the threads in both ends of the pipe P simultaneously. The rollers are thereafter retracted and the pipe P is fed from the machine by star feeders which are mounted on shafts 51, and each of which has notches 50a for receiving the completed pipe P and feeding same. The shaft 51 is preferably rotated by a chain 52 which extends from a sprocket 53 on the shaft 41 to a sprocket 54 on the shaft 51.

With the construction illustrated in Figure 2, one piece of pipe may be formed with an upset A while a second piece of pipe is formed with the bead and a third piece of pipe is formed with the threads at each end thereof, so that a continuous operation with the machine is effected with all three portions thereof operating at the same time on different sections of pipe. The device is illustrated as partially operable by hand, but it will be appreciated that various known types of electrical and mechanical controls can be employed for automatic operation whereby pipe may be fed from the supports 32 and discharged from the star feeders 50 after being completed without the handling of the pipe during such treatment.

In Figure 3, the upset-forming portion of the combination apparatus is illustrated as having the laterally-spaced end frames 30a and 31a, each of which is secured to the common base S (a portion of which is shown and which rests upon the floor or other foundation). The upset-forming member 12 has a forward tapered portion 12a extending radially from the main cylinder portion 12b. A shaft 60 is connected to the upset-forming member 12 and it extends through and is supported by, the frame member 30a and suitable bearings (not shown). The member 12 also extends through an opening 57a in a stripper plate 57 mounted on the support S so that upon retraction of the member 12 from the upset portion A of the pipe P, the pipe P is readily stripped or removed from the member 12.

The outer end of the shaft 60 is connected with a piston 61 positioned in a hydraulic cylinder 62. During the inward movement of the member 12, fluid is admitted to the cylinder 62 through an inlet line 63 and is exhausted through an outlet line 64. The fluid flow to the cylinder 62 is reversed (as explained hereinafter with respect to Figure 7) to retract the upset-forming member 12 after the upset portion A has been formed in the pipe section C. During such retraction, the fluid will flow in through the line 64 and will flow outwardly through the line 63. The cylinder 62 can, of course, be mounted in numerous ways, but preferably it is connected to the frame member 30a by welding or other suitable securing means.

The stop member 10 is substantially cylindrical and has a sufficiently large diameter so that its forward or inner face 10a provides an abutment for the end of the pipe P adjacent thereto. The member 10 is supported on a shaft 67 which extends through and is supported by a frame member 31a in suitable bearings (not shown). The outer end of the shaft 67 has connection with a piston 68 which is slidably mounted in a cylinder 69. Such cylinder 69 is connected by welding or other securing means to frame member 31a or is otherwise suitably supported. The piston 68 is moved by hydraulic fluid in a similar manner to the movement of the piston 61 and for that purpose fluid lines 70 and 71 (Figures 3 and 7) are provided so that the member 10 is moved inwardly upon an admission of fluid into the cylinder 69 through the line 70 and upon an exhaust of the fluid through the line 71. In some instances, however, the stop member may be fixed so that only the upset-forming member 12 is movable, or the stop member 10 can be the movable member and the upset-forming member 12 can be fixed. While the upset portion A is being formed in the pipe P by the relative movement of the members 10 and 12 toward each other, the pipe P is supported in the notches 36a of the star feed wheels 36 which are fixed to the shaft 37 which in turn is supported between the frame members 30a and 31a. A pulley 75 is connected to the shaft 37 and a chain or belt 76 extends around same and to a motor (not shown) which drives the shaft 37 and in turn drives the star feeders 36. Such operation is intermittent and is coordinated so that the feeding of the pipe P occurs after the upset portion A has been formed and the members 10 and 12 are retracted.

As explained before, the shaft 37 has a sprocket 44 and a chain 43 extends therefrom to the sprocket 45 (Figure 2) on the shaft 41 of the bead-forming portion of the apparatus.

The bead-forming apparatus is illustrated in Figure 4 and includes the frame members 30b and 31b which are mounted on a common base S with star feeders 40 therebetween for supporting the pipe P. For forming the annular bead B, the roller 15 is formed with an enlarged annular ring 15a which is aligned with and mates with an annular groove 16a formed in the other roller 16. The roller 16 is mounted on a shaft 78 which extends through and is suitably supported in the frame member 31b so as to be rotatable relative to such member 31b, but nonpivotal with respect thereto. A sprocket 79 is secured to the outer end of the shaft 78 for connection with a drive belt (not shown) from a motor (not shown). The rotation of shaft 78 is imparted to the shaft 80 supporting the bead-forming roller 15 through a gear 81 mounted on the shaft 78 and a gear 82 mounted on the shaft 80. The gears 81 and 82 are preferably standard spur gears which have teeth which interengage sufficiently so that upon a pivotal movement of the shaft 80 with respect to the member 31b and the shaft 78, a portion of the teeth of the gears 81 and 82 remain engaged. The shaft 80 is pivotally connected to the member 31b by pivot pins 83 extending from brackets 84 on the member 31b to the swivel housing 85 which is provided to permit rotational movement of the shaft 80 when the gears 81 and 82 are driven. The shaft 80 is normally urged upwardly by a spring 86 which is secured to and between collars or bearings 77 so as to effect the upward urging of the shaft 80 without interfering with the rotation of the shafts 78 and 80 (see Figures 4 and 4A). For moving the shaft 80 downwardly into a substantially parallel position with respect to the shaft 78, a rack 87 is mounted for reciprocating longitudinal movement by coaction with a gear 88. Such gear 88 is held against longitudinal movement but has its shaft 89 extending through a fixed support bracket 90 so that the gear 88 is free to rotate and upon rotation to move the rack 87 upwardly or downwardly, depending upon the direction of rotation of the gear 88. For imparting rotation to the gear 88, a lever arm 91 is rigidly secured to the shaft 89 and to the gear 88 and the other end thereof is pivoted at 92 to a plunger shaft 93 on a piston 94. Such piston 94 is operated by air or other fluid pressure introduced into the cylinder 95 through the fluid line 96 and exhausted through fluid line 97.

Initially the pipe P is supported in the notches 40a of the star feeders 40 with a bearing roller 59 in contact with the upper portion of the pipe P at the left end thereof. With the spring 86 acting to urge the shaft 80 to a position [pioted] *pivoted* slightly upwardly from the normal position parallel to the shaft 78, the pipe P is manually positioned over the lower die 16 with the die 15 extending into the right-hand end of the pipe P. The piston 94 is then moved downwardly to effect a rotation of the gear 88 and therefore a downward movement of the rack 87 to force the shaft 80 downwardly about its pivot pins 83 whereby a downward pressure is applied to the inside of the pipe at the annular forming ring 15a on the roller 15. Such ring 15a tends to draw and thereby enlarge the portion of the pipe P which it contacts so that the annular bead B is formed as the shafts 78 and 80 are rotated. The frictional contact between the annular ring 15a and the inside of the pipe P causes the pipe P to rotate as the bead B is formed, whereby a uniform annular bead is produced. The depth of the groove 16a will, of course, determine the limit of the deformation of the pipe P to which the bead B can be formed, although in many cases the bead may not be drawn to that full depth. After the bead B is formed, the piston 94 is moved upwardly so that the spring 86 urges the shaft 80 and die 15 upwardly, whereupon the pipe P is manually withdrawn from the dies 15 and 16.

In Figures 5 and 6, the thread-forming portion of the combination apparatus of this invention is illustrated, with Figure 5 illustrating the pipe P in position prior to the positioning of the dies 22 and 24 inside of the ends of the pipe P, which position is shown in Figure 6. The thread-forming apparatus of Figures 5 and 6 includes a frame member 30c and a similar frame member 31c, both of which are mounted upon a common base S. The frame member 30c is secured to the base S, however, while the frame member 31c is actually a carriage which is movable laterally along the base S from the position shown in Figure 5 to that shown in Figure 6. The pipe P is supported in the star feeders 50 which are provided with the notches 50a and which are firmly secured to the shaft 51 extending between the frame members 30c and 31c.

The threading die 23 is formed with a spiral rib 23a and a spiral groove 23b therebetween, which are left handed. The upper threading roll 22 is formed with a spiral rib 22a which has a spiral groove 22b therebetween which are right handed; the rib 22a is adapted to mate with the groove 23b in the roller 23. Likewise the rib 23a is adapted to mate with the groove 22b.

The die 23 is supported on a shaft 100 which extends through bearings 101 and 102 mounted on the frame member 30c, such shaft 100 being driven by a connection to a motor (not shown) through pulleys 103, 104 and 105 suitably connected by chain 106 and drive shaft 107. The shaft 100 has keyed, or otherwise secured thereto, a standard spur gear 110 which has gear teeth meshing with the teeth of spur gear 111 which is suitably attached to shaft 112 supporting the threading die 22. Such shaft 112 is mounted in a swivel 114 at its outer end, which swivel 114 has pivot pins 115 at the outside thereof which extend through brackets 116 attached to the frame member 30c (Figure 5A). A bearing 116a is disposed on the shaft 112 and a spring 117 is positioned therebelow so as to be confined between the bearing 101 and the bearing 116a. Such spring 117 urges the shaft 112 and the threading die 22 upwardly at all times, so that the dies 22 and 23 may be separated (Figure 5) for the insertion of the die 22 into the upset portion A of the pipe P.

For moving the die 22 to a position substantially parallel to the die 23, a rack 120 is mounted for longitudinal movement relative to the support S. The longitudinal movement is imparted to the rack 120 by a gear 122 which is affixed to a shaft 123 having a rotatable mounting in a bracket 124 connected to the support S in any suitable manner. A lever arm 125 is rigidly connected to the shaft 123 and therefore rigidly connected to the gear 122 whereby upon movement of the arm 125, rotation of the gear 122 is obtained, but longitudinal movement of the gear 122 is prevented. The arm 125 is pivotally connected at 126 to a piston rod 127 attached to a piston 128 located in a cylinder 129. The cylinder 129 is operated by admitting fluid under pressure through the line 130 and exhausting fluid from below the piston 128 through the line 132. The thread-forming dies 24 and 25 are mounted in an identical manner to the mounting described above in connection with the dies 22 and 23, except that such rollers are mounted on the slidable carriage 31c. Therefore, the parts connected with the threading dies 24 and 25 are identified in the drawings by the same numerals as those parts used in connection with the dies 22 and 23 except that they are followed by a prime mark. The shaft 100' is provided with splines 140 at its outer portion so that it can slide relative to the pulley 103' without disengaging from same. The carriage 31c is moved to the left for positioning the dies 22 and 24 with the ends of the pipe P by actuation of a power cylinder 200 having a piston 201 therein which is secured to the carriage 31c. As the carriage 31c moves to the left from the position shown in Figure 5 to the position shown in Figure 6, the annular flange or ring 24c first engages the right end of the pipe P and thereafter continued movement of the carriage 31c to the left moves the pipe P to the left until *the lever 131 contacts an electrical switch 141. The* [the left end of the pipe P contacts the flange or ring 22c. An] electrical switch 141 is provided for contact by the lever 131 on the carriage 31c when the carriage 31c reaches its left position and the dies thereby are in position for the threading operation on the pipe P. Upon a closing of such switch 141, dies 22 and 24 are moved downwardly to the threading position shown in Figure 6 (as explained hereinafter with respect to Figure 7) wherein they are substantially parallel to the rollers 23 and 25 so that the threads can thereby be rolled in both ends of the pipe P.

As previously mentioned, the spiral rib 22a is right handed and the spiral rib 23a is left handed. Similarly, a spiral rib 24a is right handed and a spiral rib 25a is left handed. The motor which drives the pulleys 105 and the shaft 107 drives both the pulleys 103 and 103', whereby both sets of dies 22, 23 and 24, 25 are driven by the same motor. With the spiral ribs on the dies being in the directions indicated above, the motor is connected so as to drive the thread-forming dies 23 and 25 in a counter-clockwise direction (as viewed from the right end of Figure 5 and Figure 6) so that the dies 24 and 22 are rotated clockwise (as viewed from the right-hand end of such figures). Such rotation results in the formation of right-hand threads on the external surface at the end of the pipe adjacent the bead B and right-hand threads within the upset portion A of the pipe P.

It is important to note that during such formation of the threads in the ends of the pipe P, the threads are formed simultaneously on each section of the pipe P and it has been found that because there is a tendency for the pipe to be urged to the left a slight amount, in accordance with the pitch of the spiral threads on the various dies, more uniform threads are formed on both ends because the dies 24 and 25 tend to push the pipe P to the left while the dies 22 and 23 tend to pull same to the left. If such movement does not result during the rolling action by the dies 22, 23 and 24, 25, the threads are not properly formed but instead the ribs on the rollers tend to ride over the previously-formed grooves to distort or destroy threads previously formed, or to prevent forming threads at all.

After the dies have turned a predetermined number of rotations to form the threads in the pipe P, the racks 120 and 120' are raised upwardly by reversing the fluid flow to the pistons 129 and 129' whereby the upper dies 22 and 24 are raised to separate same. *The left end of the pipe may engage a stop flange 22c after the threading operation is complete. Thereafter,* [and then] the carriage 31c is moved to the right to the position shown in Figure 5 whereupon pipe P is then manually moved from its position between the threading rollers.

Figure 7:
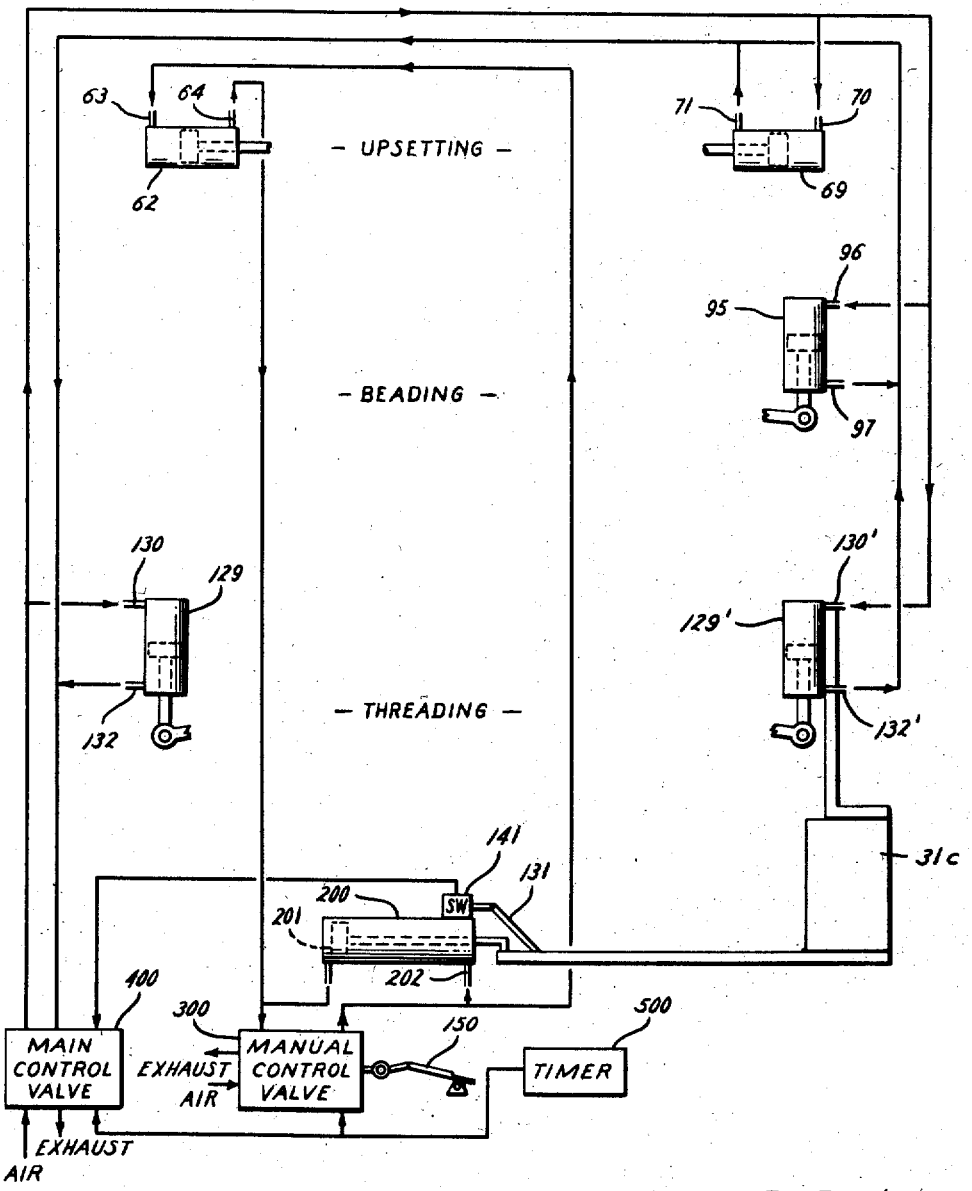
Figure 7 is a diagram of the control system for the apparatus of this invention.

In Figure 7, a diagram illustrates the control system for the operation of the various portions of the apparatus illustrated in Figures 3–6. The operator depresses the foot pedal 150 to operate the manual control valve 300 so that air or other fluid is admitted through line 202 into cylinder 200 to move the piston 201 to the left, whereby the carriage 31c (see Figures 5 and 6) is moved to the left. The arm or lever 131 is thus forced into contact with the switch 141 for actuating the main control valve 400, whereupon air or other fluid is admitted to the cylinders 62, 69, 95, 129 and 129' to operate same for simultaneously causing the upsetting, beading and threading operations to be performed on three different pieces of pipe in the manner previously described. An electronic timer 500 is set for operation a predetermined time so that the valves 300 and 400 are automatically reversed to return the pistons in the cylinders 62, 69, 95, 129 and 129' to their original positions. The star wheels 36, 40 and 50 are then rotated by driving the chains 43 and 52 to advance all of the three pieces of pipe. The pipe being threaded is of course finished and is discharged from the apparatus. The pipe which has had its annular bead formed therein is advanced for threading. The pipe which has had only the upset portion formed therein is advanced to the bead-forming dies 15 and 16. A new piece of pipe is moved into position for having the first operation performed thereon, namely, the forming of the upset portion A in the pipe. When the pipes are thus advanced, the above operations are repeated by the operator depressing the foot pedal 150.

Although the invention has been described above in connection with partial automatic operation of some of the portions of the apparatus, it will be appreciated that it is within the scope of this invention to operate the apparatus either entirely by hand, semi-automatically, or entirely automatically, the various electrical connections for such automatic operation being of the type commonly employed and well known to those skilled in the art. Likewise, the various portions of the apparatus illustrated in Figure 3–6 can be formed into a compound unit of the type illustrated somewhat schematically in Figure 2 so that sequential operation is obtained, or the portions illustrated in Figures 3–6 can be mounted separately for separate operation if so desired.

The foregoing disclosure and description of the invention is illustrative and explanatory thereof and various changes in the size, shape and materials, as well as in the details of the illustrated construction, may be made, within the scope of the appended claims, without departing from the spirit of the invention.

What is claimed is:

1. An apparatus for performing metal working operations on the ends of a tubular member and including means for forming threads on both ends of said member, said apparatus including, a first die assembly for threading one end of the member and including an inner threading die adapted to enter the bore of the member and an outer coacting threading die disposed adjacent to the outer surface of the end of the member, means for moving the threading dies of said first assembly into contact with the inner and outer surfaces of the end portion of the member and for maintaining such contact under predetermined pressure, the axis of said dies being parallel to each other and to the axis of the member when said dies are *in* engagement with the member, a second die assembly for threading the other end of the member and including an inner threading die adapted to enter the bore of said other end of the member and an outer coacting threading die disposed adjacent to the outer surface of said end of the member, means for moving the threading dies of said second assembly into contact with the inner and outer surfaces of the end portion of the member and for maintaining such contact under predetermined pressure, the axis of the dies of said second assembly being parallel to each other and to the axis of the member when the dies are in engagement with the member, the threads on the dies of both assemblies having the same pitch and lead, means fixing the dies of both assemblies against axial movement relative to the member when said dies are engaged with the member and during the thread rolling operation, means including said dies for supporting the member for unrestrained movement in a direction axially of the member when the dies are engaged with the member, and means for synchronously rotating the threading dies of both assemblies, whereby the engagement of the dies with the member imparts a rotation and longitudinal movement to the member to simultaneously form threads on each end of the member.

2. An apparatus as set forth in claim 1, together with means mounting one of the die assemblies in a fixed position, and means for mounting the other die assembly on a movable carriage in spaced relation to the first assembly in a horizontal plane, whereby the distance between the die assemblies may be varied to permit the tubular member to be positioned between or removed from the area between said assemblies.

3. An apparatus as set forth in claim 1, with means for forming an upset portion at one end of the tubular member prior to the threading operation, one of said die assemblies operating within said upset portion to form threads therein.

4. An apparatus as set forth in claim 1, with means for forming an annular bead inwardly of one end of the tubular member prior to the threading operation, one of said die assemblies acting upon the portion of the member between said bead and the end of said member.

5. An apparatus as set forth in claim 1, with means for forming an upset portion at one end of the tubular member prior to the threading operation, and means for forming an annular bead inwardly of that end of the member opposite the upset portion also prior to the threading operation, the dies of one of the die assemblies engaging the upset portion to form threads therein and the dies of the other assembly engaging the other end portion of the member between the annular bead and the member end to form threads on said portion.

6. An apparatus as set forth in claim 1, whrein each die assembly has one die mounted on a horizontal shaft, and its other die mounted upon a pivotally supported shaft which may be swung relative to the first shaft to separate the dies and permit insertion of the member therebetween, the means for maintaining a predetermined pressure on the dies comprising a movable element engageable with the pivotally supported shaft to urge the shaft in a direction holding the dies into contact with the member, and fluid-actuated means controlling the movement of said element to apply desired pressure to said shaft.

7. An apparatus as set forth in claim 1, together with means independent of the means for cynchronously rotating the dies for controlling the means which applies a predetermined pressure to the dies of the assemblies to maintain said dies in contact with the surfaces of the member.

8. An apparatus as set forth in claim 1, wherein one die assembly has one of its dies mounted on a horizontally extending fixed shaft and its other die carried by a pivotally mounted shaft, whereby swinging of the latter shaft separates the dies for entry of the end portion of the member therebetween, fluid-operated means for controlling movement of the pivoted shaft and for applying the predetermined pressure to the dies when the same are in contact with the member, a slidable carriage movable axially with respect to the member, means mounting the second die assembly on said carriage whereby the assembly is movable relative to the member to facilitate positioning and removal of the member to and from threading position between the die assemblies, said second assembly having one die mounted on a horizontal shaft and its second die carried by a pivotally mounted shaft, whereby swinging of the latter shaft separates the dies for entry of the end portion of the member therebetween, and fluid operated means for controlling movement of said pivoted shaft and for applying the predetermined pressure to the dies of said second assembly when the same are in contact with the member.

9. An apparatus as set forth in claim 1, wherein each die assembly includes a horizontally extending shaft having one die mounted thereon, a pivoted shaft which is parallel to the first shaft when the dies are in threading position and having the second die mounted thereon, a spring means between the shafts urging the shafts apart to separate the dies from contact with the surfaces of the member, a pressure-applying element engaging the pivoted shaft, a gear rack on said element, a rotatable gear in constant mesh with the gear rack, whereby rotation of the gear moves the element and applies a force thereto which is transmitted to the pivoted shaft, and a fluid actuated piston means operably connected with the rotatable gear for controlling said gear and the movement of the pressure-applying element.

References Cited in the file of this patent or the original patent

UNITED STATES PATENTS

| | | |
|---|---|---|
| 326,516 | Pierce | Sept. 15, 1885 |
| 1,392,844 | Merolle | Oct. 4, 1921 |
| 1,623,807 | Oakley | Apr. 5, 1927 |
| 1,782,994 | Lindgren | Nov. 25, 1930 |
| 2,004,816 | Lindgren | June 11, 1935 |
| 2,342,817 | Plagemann | Feb. 29, 1944 |
| 2,506,657 | Webster | May 9, 1950 |
| 2,548,444 | Parker et al. | Apr. 10, 1951 |
| 2,669,139 | Finch | Feb. 16, 1954 |

FOREIGN PATENTS

| | | |
|---|---|---|
| 120,464 | Australia | Oct. 11, 1945 |